(12) United States Patent  
Olschafskie et al.

(10) Patent No.: US 8,793,219 B2
(45) Date of Patent: Jul. 29, 2014

(54) EXCERPT RETRIEVAL SYSTEM

(76) Inventors: Francis Olschafskie, Boston, MA (US); Allan Chasanoff, New York, NY (US)

( * ) Notice: Subject to any disclaimer, the term of this patent is extended or adjusted under 35 U.S.C. 154(b) by 2948 days.

(21) Appl. No.: 11/220,484

(22) Filed: Sep. 7, 2005

(65) Prior Publication Data

US 2007/0055659 A1 Mar. 8, 2007

(51) Int. Cl.
*G06F 17/30* (2006.01)

(52) U.S. Cl.
USPC .......................................................... 707/661

(58) Field of Classification Search
USPC ................. 235/494, 454, 375; 707/205, 6, 10
See application file for complete search history.

(56) References Cited

U.S. PATENT DOCUMENTS

| | | | | |
|---|---|---|---|---|
| 5,038,393 | A | | 8/1991 | Nanba ............................... 382/61 |
| 5,412,188 | A | | 5/1995 | Metz ................................ 235/375 |
| 5,486,686 | A | | 1/1996 | Zdybel, Jr. et al. ............ 235/375 |
| 5,574,804 | A | * | 11/1996 | Olschafskie et al. .......... 382/313 |
| 5,760,382 | A | | 6/1998 | Li et al. .......................... 235/436 |
| 5,920,877 | A | * | 7/1999 | Kolster .......................... 715/235 |
| 6,088,707 | A | * | 7/2000 | Bates et al. .................... 715/235 |
| 6,616,038 | B1 | * | 9/2003 | Olschafskie et al. .......... 235/454 |
| 2002/0076110 | A1 | * | 6/2002 | Zee ................................. 382/229 |
| 2003/0042319 | A1 | * | 3/2003 | Moore ............................ 235/494 |
| 2005/0067482 | A1 | * | 3/2005 | Wu et al. ........................ 235/375 |

FOREIGN PATENT DOCUMENTS

EP 0 697 793 2/1996

OTHER PUBLICATIONS

"*Keys for editing and moving text and graphics* ", Microsoft Word 97 SR-1 © 1983-1997 Microsoft Corporation.
"*Consumer Electronics Show (CES)*",Pocket PC, Apr./May 2004.

* cited by examiner

*Primary Examiner* — Syling Yen
(74) *Attorney, Agent, or Firm* — Sunstein Kann Murphy & Timbers LLP

(57) ABSTRACT

A selection extender instructs a data retrieval system to identify an excerpt demarcated by a first and last symbol. Generic destination indicators identify digital destinations with which an excerpt can be associated. An information record can be provided with a selection extender and/or generic destination indicators thereon. An input device may receive a selection extender and/or generic destination indicators in any of a variety of ways including scanning, movement detection, sound detection, touch activation, handwriting or other input mechanism.

10 Claims, 5 Drawing Sheets

EXCERPT RETRIEVAL SYSTEM

BACKGROUND OF THE INVENTION

The present invention relates to information retrieval, particularly the retrieval of a portion of an information record and/or the insertion of that portion into a digital destination such as a file or field.

Digital storage of information has tremendous advantages. Text may be stored, categorized and easily searched. The digital environment also offers the opportunity to store not only text, but multimedia files such as sound, graphics and video. Enormous amounts of information may be stored in a relatively small physical space.

There remains, however biases toward absorbing information through reading off of a printed page. Office workers often print out documents otherwise available on their computer. Students can be found in libraries carrying their laptop computers and yet reading from printed books. Nevertheless, highlighted or marked up collections of books and papers can be unduly cumbersome given the availability of computers. It is desirable to be able to more easily maintain an abridged electronic archive of knowledge gleaned from information records such as books, papers and electronic sources such as the Internet.

Methods for retrieving text and storing it into an electronic system are described in U.S. Pat. No. 6,616,038 (Olschafskie et al.), the full disclosure of which is hereby incorporated by reference herein. This prior patent describes using an optical scanner on a printed book that has a corresponding digital version. Excerpts can be retrieved accurately because they are already available in digital form. It is only necessary to identify the portions to be retrieved for storage or later access. It is desirable to improve the efficiency of such retrieval and storage.

SUMMARY OF THE INVENTION

Retrieval of excerpts in an electronic system can be facilitated by embodiments of the present invention. In accordance with an embodiment of the invention, a body of information, including symbols, is situated upon an information record. The information record may be a digital record such as is found on a web page or some other source of data from a database. Alternatively, the information record may be a physical page on which the body of information is printed. Reliable retrieval of information from a page can be enhanced if the information record has a corresponding digital version of the body of information. The symbols may be of various types. One type of symbol may be used to provide line numbers identifying a line of text. Other symbols may simply demarcate the text into discrete segments. The symbols will indicate a respective location within the digital version of the body of information. Symbols may appear adjacent to a line of text or they may be embedded into alphanumeric characters or other matter in the information record. Symbols may be visible or invisible, so long as they may be detected by a machine or device for reading the symbols.

One of the machine readable symbols on the information records may be what is called herein a selection extender. A selection extender acts as an instruction indicating that retrieval of data should take place from data indicated by a first symbol to data indicated by a second symbol entered along with the selection extender into an electronic system. Thus rather than just simply excerpting a line associated with a line number symbol, entry of the selection extender informs the electronic system that an excerpt begins the line indicated by a first line number symbol and ends with the line indicated by a second line number symbol. Thus, multiple lines may be easily excerpted. Alternatively, the excerpt may begin with a location in the data indicated by a first symbol and extend to the location in the data indicated by the second symbol. The selection extender symbol may take any form. For example, it may appear as a letter or an icon or other symbology to designate its purpose as a selection extender.

In a further embodiment of the invention, a method makes use of an input device to retrieve an excerpt from an information record. The input device may include a scanner, a microphone, a digital pen, a keypad, a motion detector or other input mechanisms. The input device may be used with an information record regardless of whether it is printed on a hard page or it appears on an electronic display. Retrieval of an excerpt from an information record can be accomplished by providing an electronic data retrieval system with a signal indicating a beginning for the excerpt, a signal indicating an end for the excerpt and a signal indicative of a selection extender instructing the system to retrieve the excerpt from the beginning to the end. The excerpt is taken from a digital record containing or corresponding to the information record. The electronic data retrieval system is typically remote from the input device, but portions of the electronic data retrieval system may be housed within the input device as well. Indeed, miniaturization and wireless capabilities may permit such a device to carry a substantial portion of the data storage capacity and processing power for the data retrieval system.

A user chooses when to enter a selection extender instruction. A machine readable selection extender may appear within the information record permitting the user to scan the extender with an input device having a scanner. The input device can thereafter input a signal indicative of the extender to the electronic data retrieval system. Alternatively, the selection extender may be found on the input device itself as a button or other input mechanism for activation by a user. In a still further alternative, the input device may include motion detection circuitry that allows a user to wave the input device in a predefined movement to cause entry of a signal indicative of the selection extender for later input to the electronic data retrieval system. In an even further alternative, the input device may include a microphone so that sounds may be issued into the microphone to cause entry of the selection extender into the input device for later input to the electronic data retrieval system. In another alternative, the input device may act as a digital pen allowing user to handwrite a symbol corresponding to a selection extender instruction, the symbol being recognized upon input to a suitably programmed data retrieval system.

Symbols associated with a beginning or end of an excerpt are visible or invisible on the information record. Symbols may be spoken into the microphone for entry into the input device. Alternatively, the symbols may be scanned by a scanner on the input device for entry thereto. Another alternative provides the input device with digital pen capability so that the symbols may be handwritten for entry into the input device. The symbols, preferably link to respective digital locations in a corresponding digital version of the information record. The symbols are useful in identifying desired excerpts. The symbols may, for example, be line numbers, which identify a segment of data typically viewed as a line on a page, or embedded symbols within the body of information that identify a location anywhere along the body of information.

In order to make the information gathered in this way more useful to the user, it is desirable to organize the retrieved data. This can be done by inserting the information into an appropriate digital destination such as a file, a field, a folder, an object or the like. In order to make specific insertion of excerpts generally available for information records and yet allow each user to customize his or her database for finding excerpted information, it is desirable to make use of generic destination indicators. The generic destination indicators may be different symbols visibly located in the information record for access by anyone electronically saving and categorizing excerpts. In a preferred embodiment, the generic destination indicators are a set of different alphanumeric characters. In the electronic data retrieval system, a user associates the generic destination indicators with particular digital destinations. On a printed page, the generic destination indicators allow a scanner to be used to scan and identify an excerpt and then scan a specific destination indicator for associating the excerpt with the selected file. An excerpt for association with a digital destination determined by a selected generic destination indicator may be input as described above by using a selection extender and beginning and end symbols. Alternatively, an excerpt may be simply scanned. Another method is to scan line numbers associated with the lines of text that comprise an excerpt. Any suitable method may be used to retrieve an excerpt for insertion into a digital destination designated by a selected generic destination indicator.

The selection of a selected generic destination indicator may be accomplished by scanning one of a plurality of generic destination indicators found on the information record. Alternatively, an input device may itself come equipped with a variety of selectable indicators. Activation of any one of said indicators on the input device causes the selection of a generic destination indicator for determining the destination of an excerpt. A still further alternative includes providing motion detection circuitry within an input device such that specific movements of the input device may be used to identify one of a plurality of generic destination indicators. A still further alternative for entering a generic destination indicator includes the use of a microphone for receiving sounds selecting one of the plurality of generic destination indicators. Another alternative is handwriting with a digital pen input device.

Other objects and advantages will become apparent during the following description of a specific embodiment of the invention taken in conjunction with the drawings.

DETAILED DESCRIPTION OF SPECIFIC EMBODIMENTS

Figure 1:
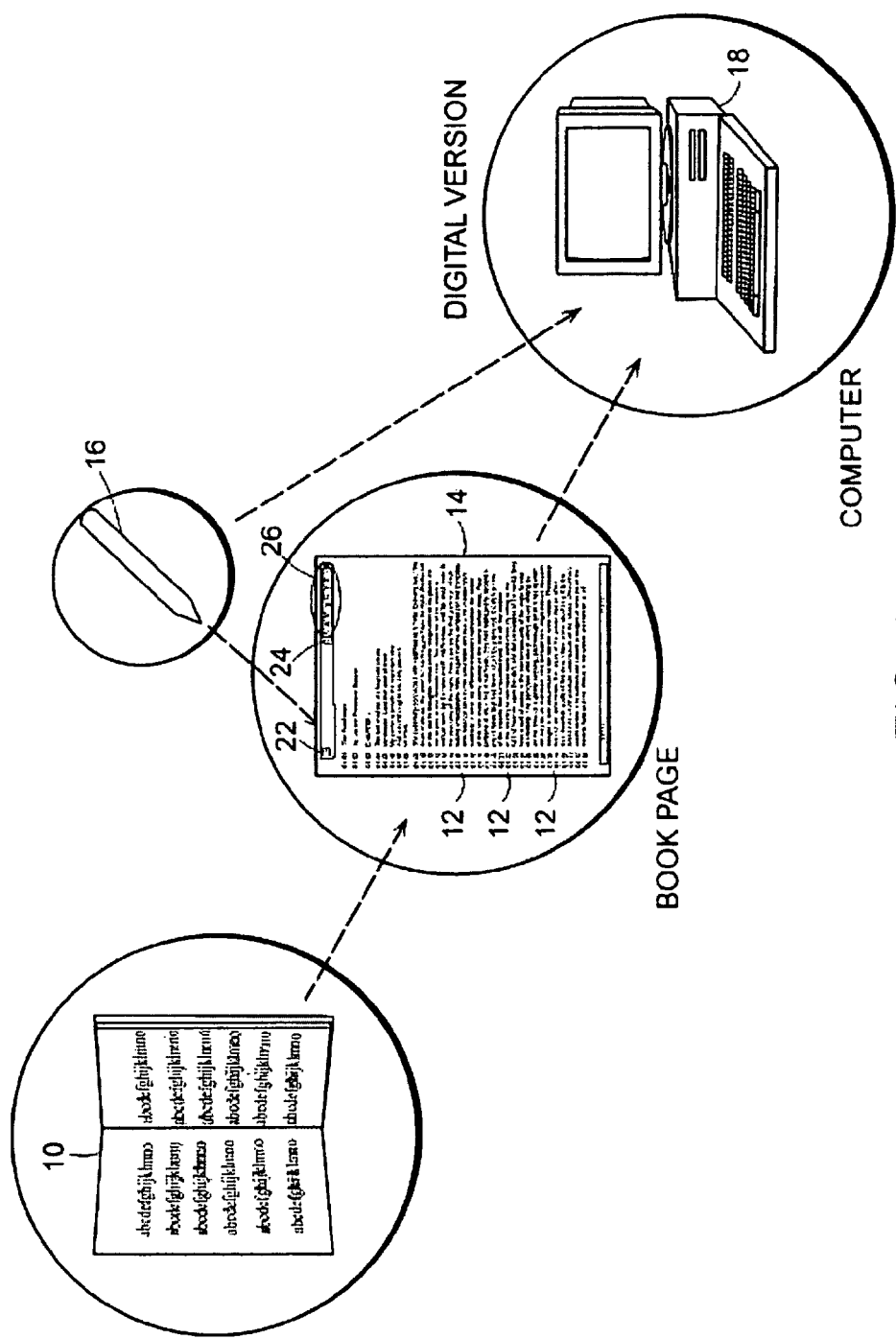
FIG. 1 illustrates an embodiment of an information record of the present invention accessed by a data retrieval system.

Referring now to the drawings, FIG. 1 shows an information record in the form of a printed page 14 from a book 10. To the extent that books can be printed with symbology that facilitates electronic data retrieval, it is believed that such books will become more relevant to the digital age. Alternatively, the printed page 14 may simply be an electronic record that has been printed. In either case, it is useful to provide an electronic data retrieval system 18 access to a digital version of the information record on the printed page. The digital version may be stored locally in the data retrieval system within a computer or within an input device 16. Alternatively, data storage may be external to the data retrieval system in the form of a CDROM, a DVD, a flash memory device or accessible through an internet. Excerpt information input by an input device 16 should be associated with a signal or symbol indicating the identity of the information record, so that the electronic data retrieval system accesses the proper digital version. Such identity may come from a symbol 22 on the information record identifying the information record itself or otherwise entered into the system. The symbol 22 may be associated with a collection of metadata that identifies the information record and may provide additional information about the record such as author, title, dates, author biography, a critique of the work, a film clip, etc.

The information record includes symbols 12 that can be used for identifying a beginning or end of an excerpt. In accordance with the embodiment of an information record shown in FIG. 1, each line of the text has a line number symbol 12. The line number symbol 12 is printed on the page in a machine-readable font as a line number. Thus, an input device 16 with a scanner may be used to scan one or more of the line numbers to indicate lines to be excerpted from the text. The line numbers are digitally identifiable in the digital version of the information record with the associated line of text so that the line number symbols may be used in the data retrieval system to access the desired text from the digital version of the information record.

Figure 4:
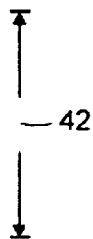
FIG. 4 is an icon for use in the present invention.

Instead of entering each line number symbol for the lines of text desired to be excerpted, in accordance with an embodiment of the present invention, a machine-readable selection extender 24 may be printed on the page 10. Scanning the machine-readable selection extender before or after scanning a first line number symbol provides the instruction that the excerpt should be taken from the first line number signal to the second or last line number symbol. Thus, an excerpt of contiguous lines of text may be indicated by using the machine-readable selection extender in conjunction with a first and last line number symbol. In the embodiment of FIG. 1, the machine-readable selection extender 22 is an alphanumeric character, in particular, an "X." In an alternative embodiment, the machine-readable selection extender may be an icon 42 such as the one illustrated in FIG. 4.

The information record of the embodiment of FIG. 1 further illustrates the use of generic destination indicators 26. In accordance with the embodiment of FIG. 1, the generic destination indicators 26 are a plurality of alphanumeric characters. In FIG. 1, the generic indicators 26 are the letters A, B, C, D, R, S, T, U allowing different users to customize their data retrieval system to assign the indicators to their own set of digital destinations. A user can associate one of the letters, "D", for example, with a particular user file or with a field in a database or form. By having the generic destination indicators 26 appear on the printed page 10, a scanner on the input device 16 can be used to scan a selected one of the generic destination indicators so that the excerpt will be associated with the desired destination in the data retrieval system. Thus, data may be retrieved and made accessible in an organized fashion associating excerpted portions of information with an appropriate file by simply scanning the destination indicator 26 that has been associated with the desired file. Similarly, the excerpt may be inserted into a field associated with the selected generic destination indicator 26 and in that way the fields of an electronic form can be filled out.

It is noted that such a system may be of particular value to the examiners in the United States Patent and Trademark Office. Patents typically already include line number symbols. Digital versions of patents are generally available. An examiner would be able to develop a personal searchable electronic file of excerpts from patents by making use of any of a number of the embodiments described herein. Examiners can customize the names of the files to facilitate later retrieval of excerpts relevant to a topic.

The input device 16 may be connected to the computer of the data retrieval system by a wire connection. Alternatively, a wireless communication pathway between the input device 16 and the computer 18 may be established. The input device 16 can communicate with the data retrieval system in real time as the excerpts are being extracted. Alternatively, the scanner may store the excerpt information along with an associated generic destination indicator 26 for later input into a data retrieval system. While a portion of the data retrieval system may be included within the input device if it is provided with sufficient memory or has access to an internet, embodiments are also contemplated in which the data retrieval system is remote from the input device in a computer or computer system.

Figure 2:
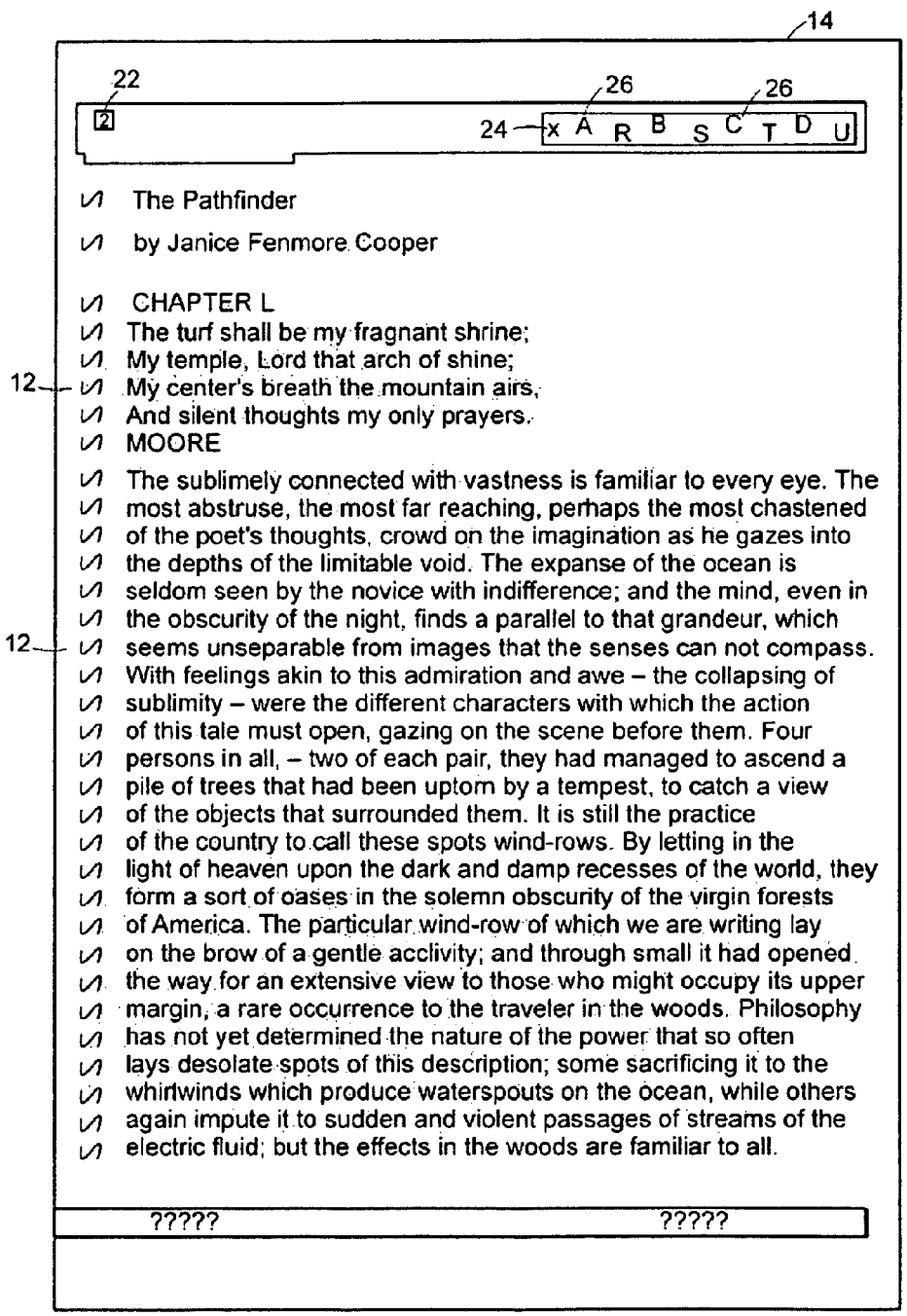
FIG. 2 is a plan view of an alternative embodiment of an information record of the present invention.
Figure 3:
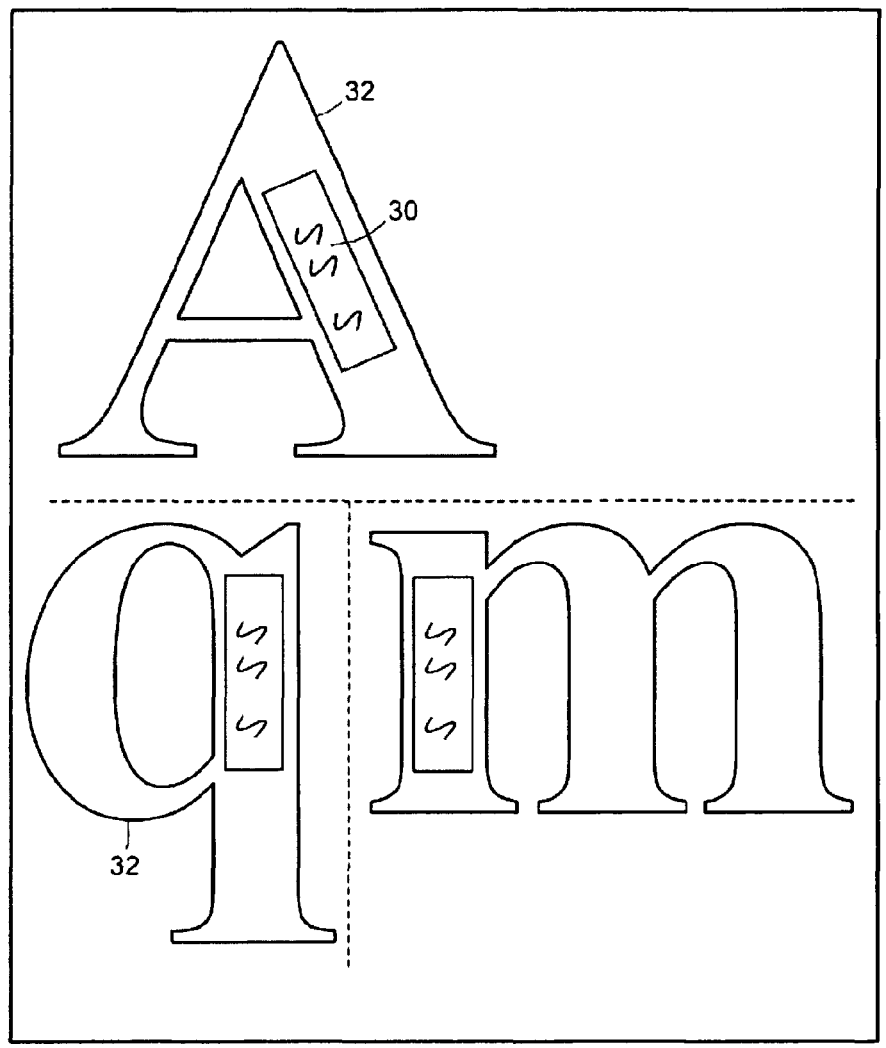
FIG. 3 illustrates an embodiment of the symbols of the present invention.

Referring to FIGS. 2 and 3, it is seen that there are a variety of alternatives for machine-readable symbols used in identifying the bounds of an excerpt. Machine-readable symbols come in all shapes and sizes including bar codes, Morse code, alphanumeric characters, two-dimensional codes, color codes or, indeed, any code 12 for use in identifying locations along an information record. In FIG. 2, the symbols 12 are again used for identifying lines of information on a page 14. It is recognized that information may include more than simply text such as images or graphs. Moreover, an information record for use in the present invention need not be a printed page. The information record may appear on an electronic display, such as a computer monitor, an LCD display or other such display. An input device 16 may still be used for extracting excerpts from the displayed page in the same manner as for inputting excerpt information and instructions with respect to a printed page. On an electronic information record, the scope of information expands to multi-media files such as audio and video files.

Rather than merely identifying line numbers, codes may be used throughout an information record to identify any location along that record. The codes may be embedded in alphanumeric characters such as shown in the codes 30 of FIG. 3. The use of embedded codes and a variety of such codes that may be used with the present invention are described in U.S. Pat. No. 6,460,766 (Olschafskie et al.), the full disclosure of which is hereby incorporated by reference herein. It should be understood that the codes 30 may be visible or invisible to the human eye. Codes may be embedded in text being printed on a page. Alternatively, the codes may be invisible involving the paper or other substrate upon which the information has been printed. The paper or substrate itself may include machine-detectable strands or designs that can be used as symbols to identify locations within the information record. It is desirable that any such symbol be detectable by a scanner device for use with a data retrieval system.

Figure 5:
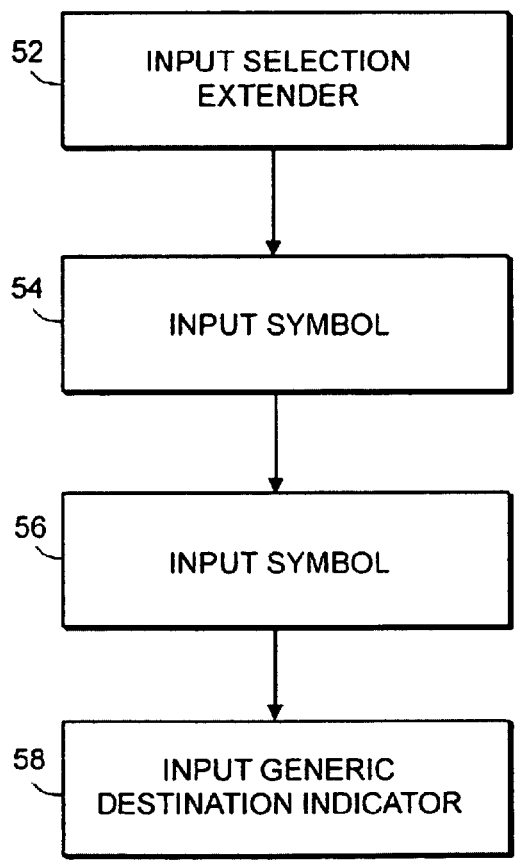
FIG. 5 is a flow chart illustrating an embodiment of a method of the present invention.

Referring now to FIG. 5, a simplified flow chart of a method facilitating data retrieval is illustrated. A contiguous series of information can be identified in an information record by a first symbol, a last symbol and a selection extender indicating that the entire contents between the locations identified by the first two symbols should be extracted from the information record. If desired, a generic destination indicator may be included so that the excerpt can be associated with or stored in an appropriate file or field designated by the indicator. The selection extender 52 and first 54 and last symbols 56 are input into a data retrieval system thereby identifying an excerpt in the digital version of an information record. The data retrieval system can copy that excerpt and store it into a default storage file. Alternatively, the data retrieval system can store a pointer to the excerpt. However, if a generic destination indicator has been input 58 to the system as well, the excerpt can be tagged for association with the designated file and/or field and/or other such destination associated with the generic destination indicator. The excerpts may be stored directly to user files or fields. Alternatively, a pointer to the excerpt can be stored in a designated file in a manner making the excerpt available for searches conducted later through the file. A user may thus accumulate files of excerpts organized in a customized manner for ease of later retrieval.

Figure 6A:
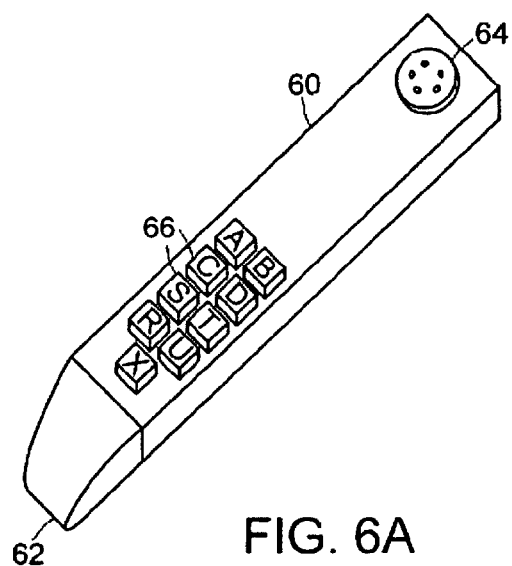
FIGS. 6a and 6b are perspective views of a couple embodiments for an input device for use in accordance with the present invention.
Figure 6B:
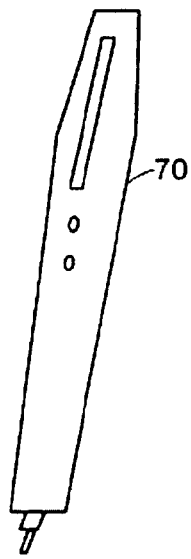

FIGS. 6*a* and 6*b* provide just two of many input device possibilities. There are a variety of ways to retrieve the symbols and indicators that are to be input into the data retrieval system. In one embodiment, the input device 16 may be a scanner device 60 including an optical scanner 62 for detecting a machine-readable selection extender or a generic destination indicator on the information record itself. The scanner 60 may also be used for recognizing the symbols which identify locations along the information record either as line numbers or as more specific location information. The optical scanner 62 can be a linear array of scanning elements, as shown. Alternatively, the scanning elements may be concentrated at the tip of a pen or otherwise arranged on the input device.

Numerous alternatives to scanning are available for entering the symbols and indicators. For example, the input device may come equipped with a microphone 64. Sound signals may be uttered for entry into the input device which may provide the selection extender instruction or identify a specific generic destination indicator. Indeed, line number symbols may be read into the input device through the microphone. In a further alternative, the input device may come equipped with buttons 66 or an interactive display which permits user activation of a selection extender instruction or a specific generic destination indicator. In accordance with a further embodiment, the input device may include motion detection electronics so that specific movement of the input device may be used to provide the selection extender instruction or designation of a specific generic destination indicator. For example, waving the input device in a movement representative of an "X" might be used as the indication that selection extension is desired and that the location symbols being entered identify the beginning and end of an excerpt. A variety of specific motions may be associated with a plurality of generic destination indicators such that movement in accordance with one of those indicators is used to enter that indicator in association with an excerpt. In a further embodiment, the input device may be a digital pen 70. The digital pen allows the user to handwrite symbols or to trace over symbols for entry into the system. In still further embodiments, the input device may be a combination device that also acts as any one or more of a cell phone, a personal digital assistant, a scanner, a mouse or any of a number of handheld devices.

A computer associated with the data retrieval system may be used to associate generic destination indicators with specific user files. For example, a user may have a variety of files each associated with a different issue potentially being contested in a lawsuit. As the user reviews printed case decisions, excerpts may be extracted from case decisions and associated with the issue in the case selected by the user. The user enters into the computer associations between the generic destination indicators and the various issues. These associations may be used for a given data retrieval session. In a later session, the generic destination indicators may at the user's option be associated with a different set of issues for use in a different case. Thus, the same generic destination indicators may be used over and over again to refer to different files set up by the user at the data retrieval system.

Of course, it should be understood that various changes and modifications to the preferred embodiments described above will be apparent to those skilled in the art. Such changes and modifications can be made without departing from the spirit and scope of the invention and without diminishing its attendant advantages. It is, therefore, intended that such changes and modification be covered by the following claims.

We claim:

1. A method for distributing excerpts from an information record among a plurality of digital destinations selectable by a user, the method comprising:

associating each of the plurality of digital destinations with one of a plurality of generic destination indicators;

selecting, with a scanner device, an excerpt from the information record;

using the scanner device to select the generic destination indicator associated by the user with a digital destination; and responsive to using the scanner device to select, storing the excerpt in the digital destination associated by the user with the selected generic destination indicator.

2. The method of claim 1 wherein selecting an excerpt comprises scanning the excerpt on the information record.

3. The method of claim 1 wherein selecting an excerpt comprises inputting a machine readable selection extender, inputting a symbol associated with a beginning of the excerpt, and inputting a symbol associated with an end of the excerpt.

4. The method of claim 3 wherein each of the symbols is associated visually on the information record with its respective location in the information record and identifies its respective location in a corresponding digital version of the information record.

5. The method of claim 4 further comprising retrieving the excerpt from the corresponding digital version of the information record.

6. The method of claim 3 wherein each of the steps of inputting is preceded by scanning the respective extender or symbol on the information record.

7. The method of claim 1 wherein the plurality of generic destination indicators are on the information record and the generic destination indicator is selected by scanning one of the plurality of generic destination indicators on the information record.

8. The method of claim 1 wherein the plurality of generic destination indicators are on the scanner device and the generic destination indicator is selected by activating one of the plurality of generic destination indicators on the scanner device.

9. The method of claim 1 wherein a predefined movement of the scanner device is recognized as one of the plurality of generic destination indicators for selection of the generic destination indicator.

10. The method of claim 1 wherein the scanner device includes a microphone and further comprising receiving sounds through said microphone to select one of the plurality of generic destination indicators.

* * * * *